United States Patent [19]
Villafuerte

[11] Patent Number: 6,130,407
[45] Date of Patent: Oct. 10, 2000

[54] ARC WELDING TORCH

[75] Inventor: Julio Villafuerte, Tecumseh, Canada

[73] Assignee: Tregaskiss, Ltd., Oldcastle, Canada

[21] Appl. No.: 09/286,264

[22] Filed: Apr. 5, 1999

Related U.S. Application Data

[60] Provisional application No. 60/094,587, Jul. 29, 1998.

[51] Int. Cl.[7] ................................................. B23K 9/095
[52] U.S. Cl. ........................................ 219/130.01; 901/42
[58] Field of Search ..................... 219/130.01, 124.34, 219/130.21, 130.31, 130.32, 130.33, 137.2, 137.31, 137.71, 74, 75; 266/49; 901/42

[56] References Cited

U.S. PATENT DOCUMENTS

| | | | |
|---|---|---|---|
| 3,509,314 | 4/1970 | Freytag | 219/137.31 |
| 4,450,339 | 5/1984 | Corby, Jr. | 219/124.34 |
| 4,497,996 | 2/1985 | Libby, Jr. et al. | 219/124.34 |
| 4,521,670 | 6/1985 | Case, Jr. et al. | 219/130.01 |
| 4,521,672 | 6/1985 | Fronius | 219/130.33 |
| 4,540,869 | 9/1985 | Yasuoka | 219/124.34 |
| 5,221,825 | 6/1993 | Siewert et al. | 219/130.01 |
| 5,391,852 | 2/1995 | Weaver et al. | 219/74 |
| 5,614,116 | 3/1997 | Austin et al. | 219/124.34 |
| 5,811,055 | 9/1998 | Geiger | 266/49 |

FOREIGN PATENT DOCUMENTS

| | | | |
|---|---|---|---|
| 154591 | 4/1982 | German Dem. Rep. | 219/130.01 |
| 2708980 | 9/1978 | Germany | 219/137.71 |
| 3333151 | 3/1985 | Germany | 219/130.21 |
| 40 20342A1 | 1/1992 | Germany. | |
| 61-229475 | 10/1986 | Japan | 219/130.21 |
| WO 86/04846 | 8/1986 | WIPO. | |
| WO 93/00196 | 1/1993 | WIPO. | |
| WO 98/34751 | 8/1998 | WIPO. | |

Primary Examiner—Clifford C. Shaw
Attorney, Agent, or Firm—Fildes & Outland, P.C.

[57] ABSTRACT

An arc welding torch for robotic applications having sensing capabilities to provide intelligent diagnostics monitoring of the welding process in real time. A plurality of modular sensors are integrated with the torch to provide real-time monitoring of wire speed, arc voltage, gas flow, seam-tracking, welding current temperature and contact tip wear. The torch includes a contact tip wear sensor for sensing the wearing of the tip during the welding process. The shielding gas flow is measured by a gas flow sensor mounted between the main housing and the gooseneck. A seam-tracking sensor is mounted on the outside of the housing to detect the position of the seam to be welded. The speed of the consumable electrode is measured by a wire speed sensor module. To ensure that operating temperatures of components near the arc region are within predetermined ranges for optimum performance of the torch, temperature sensors are mounted on the torch. An arc voltage sensor is located in the housing of the torch to provide a more accurate measurement of the arc voltage near the arc region. Lastly, a current sensor is located between the main housing and the gooseneck to measure the current flow through the torch. All of the above sensors may be operatively connected to a weld controller which analyze the information received from each sensor to maintain an optimum welding process.

11 Claims, 2 Drawing Sheets

ARC WELDING TORCH

CROSS REFERENCE TO RELATED APPLICATIONS

This application claims the benefit of U.S. Provisional Application Ser. No. 60/094,587, filed Jul. 29, 1998.

FIELD OF THE INVENTION

This invention relates generally to arc welding torches used in robotic applications and, more particularly, to an arc welding torch having sensing capabilities to provide intelligent diagnostics of the welding process in real time.

BACKGROUND OF THE INVENTION

There is an increasing usage of welding robots in the welding industry. Arc welding robotics systems consist of welding power source, wire feeder, robot controller, manipulator and welding torch. The welding torch is a key component of such systems. The torch delivers the welding power necessary to produce a fusion joint. The front-end components of the torch are exposed to harsh conditions near the arc region. The other components are exposed to mechanical strain and other environmental conditions. Failure of one or more components of a welding torch usually translate into a loss of weld quality which brings the automatic cell to a halt until the failed component(s) is(are) replaced. Normally, at this point, faulty welds must be repaired or the part must be scrapped which adds to the cost of lost productivity.

Monitoring devices capable of detecting faults before or right after they occur are highly desirable. Currently, there is limited preventive or diagnostic sensing of the process in robotic welding operations. Process soundness is typically determined by monitoring welding current and arc voltage and flagging alarms anytime their actual values fall outside predetermined thresholds. This is done by weld controllers using current and voltage signals from the welding power source. Arc welding is a complex process and threshold monitoring is not sufficient for full diagnostics of the process. It is desirable to produce a gas metal arc welding (GMAW) torch that integrates a series of sensing capabilities for intelligent complete diagnostics of the welding process in real time.

SUMMARY OF THE INVENTION

The present invention provides an arc welding torch that has sensing capabilities to provide intelligent complete diagnostics of the welding process in real time. A plurality of sensors are integrated with the torch to provide real-time monitoring of wire speed, arc voltage, gas flow, seam-tracking, temperature, current and contact tip wear.

The welding torch includes a contact tip wear sensor which detects the wearing down of the contact tip by using an electrical resistance measurement. This measurement is taken between the contact tip and consumable electrode. Shielding gas flow is measured by a gas flow sensor located at the torch front housing. A seam-tracking sensor is mounted on the torch housing to detect a seam to be welded.

To ensure that the torch components near the arc region are operating within certain operating temperatures, temperature sensors can be mounted on such components. An arc voltage sensor located in the housing of the torch provides a voltage signal indicative of the arc voltage near the arc region. The wire feed rate is measured by a sensor located adjacent the electrode, providing a more accurate measurement of the actual wire feed speed. The welding current is measured by a current sensor located at the front housing of the torch.

All of the above sensors can be operatively connected to a weld controller which analyzes the information received from each sensor and in response to that information maintains an optimum welding process.

These and other features and advantages of the invention will be more fully understood from the following detailed description of the invention taken together with the accompanying drawings.

DETAILED DESCRIPTION OF THE INVENTION

Figure 1:
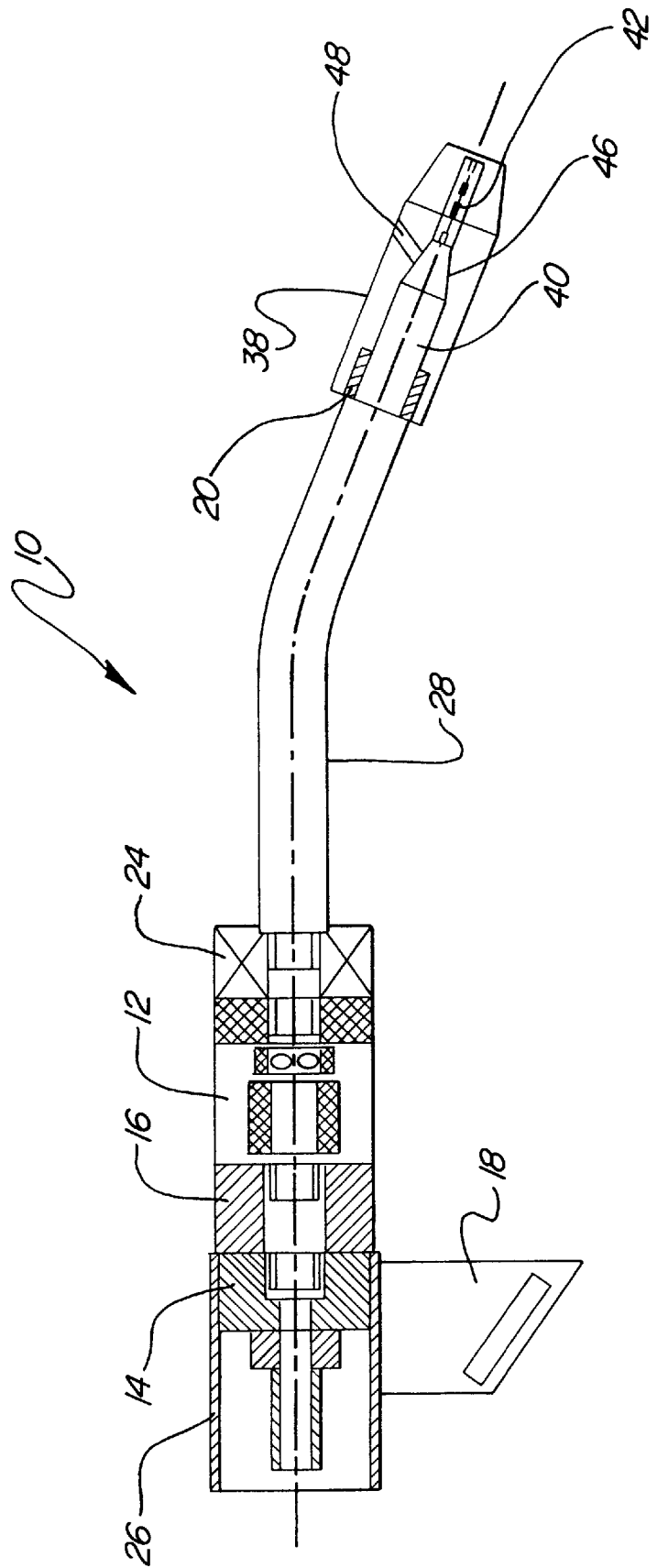
FIG. 1 is a cross section of the front-end of a GMAW welding torch in accordance with the present invention.

Referring now to FIG. 1 in detail, numeral 10 generally indicates a GMAW torch. The torch provides sensing capabilities for intelligent diagnostics of the welding process in real time. Sensors 12, 14, 16, 18, 20, 22 and 24 are integrated with the torch 10 to provide real-time diagnostic monitoring of wire speed, arc voltage, gas flow, seam-tracking, temperature, contact tip wear and welding current.

The arc-welding torch 10 broadly includes a main housing 26, a gooseneck 28, and a contact tip assembly 30. A cable (not shown) is connected to a first end 32 of the main housing 26 to supply gas, electrical current and a consumable electrode 34 to the torch 10. The gooseneck 28 is connected to a second end 36 of the housing 26 and may serve as the front-end of any of the sensors described herein. The gooseneck 28 provides the means by which the consumable electrode 34, the shielding gas and the welding current are conducted to the contact tip assembly 30.

A wire speed sensor 12 can be attached to the main housing 26 to measure wire speed. Sensor 12 measures the rate at which the consumable electrode 34 is being feed through the torch 10. The sensor 12 may include a drive-roll mechanism (not shown) that spins as the consumable electrode passes through the torch and several miniature encoders (not shown) that produce a pulse signal. The pulses are proportional to the rate at which the drive-roll mechanism is spinning and thus the rate at which the consumable electrode 34 is being feed through the torch 10. The signal may be applied to a weld controller 37 which determines from the signal the consistency and stability of the welding process.

An arc voltage sensor 14 which provides a shielded positive side of the arc voltage is located within the housing 26 and produces a voltage signal with respect to ground indicating the true arc voltage. Arc voltage is electrical potential between electrode and workpiece. Voltage indicated by the power source meter is commonly referred to as the arc voltage and, consequently, proportional to arc length. This measure of arc length is inaccurate because there are many locations in the welding circuit where a drop in voltage occurs other than across the arc. These voltage drops are a function of cable size and length, conduction efficiency of the power carrying connections, condition of the contact tube in the torch and electrode extension. By integrating the arc voltage sensor 14 with the torch 10 the arc voltage can be measured closer to the arc region and thus provide a more accurate reading of the actual arc voltage.

A gas flow sensor 16 can be attached to the main housing 26. Sensor 16 measures the flow of the shielding gas through the torch 10. The sensor 16 produces a gas flow signal that can be applied to the weld controller which triggers an alarm when the gas flow signal indicates that the gas flow has moved out of a desired predetermined range.

A seam-tracking sensor 18 is mounted on the outside of the housing 26 near the second end 36 of the housing. The seam-tracking sensor 18 provides a seam detecting signal that indicates the seam to weld pool displacement. The sensor 18 may be a laser sensor, optical sensor, and/or a touch seam-tracking sensor. By having the seam-track ing sensor 18 integrated with th e torch, it is possible to correct the position of the torch with respect to the seam and to account for tooling and parts variability during production.

The contact tip assembly 30 includes a gas nozzle 38, contact tip 40 and a temperature sensor 20. The contact tip 40 includes an axial bore 42. The contact tip 40 provides a sliding electrical contact between a power supply 43 and the electrode 36, allowing the welding current to be transferred to the consumable electrode 36. The nozzle 38 has a bore 44 that is in alignment with axial bore 42 when the nozzle 38 is attached to the contact tip 40. The nozzle 38 includes a transition region 46 having gas ports 48 that pass from transition region 46 to outside of nozzle 38 and are oriented so that inert gas passing from inside the nozzle 38 through the ports 48 displaces air around an end of contact tip 40.

A temperature sensor 20 consisting of a thermocouple device is located near the connection point between the gooseneck 28 and the gas nozzle 38 of the contact tip assembly 30. The temperature sensor 20 provides a temperature signal that can be applied to the welding controller. The weld controller determines from the temperature signal whether the temperature of the components of contact tip assembly 30 are within a desired predetermined temperature range to ensure optimum performance of the torch 10.

Figure 2:
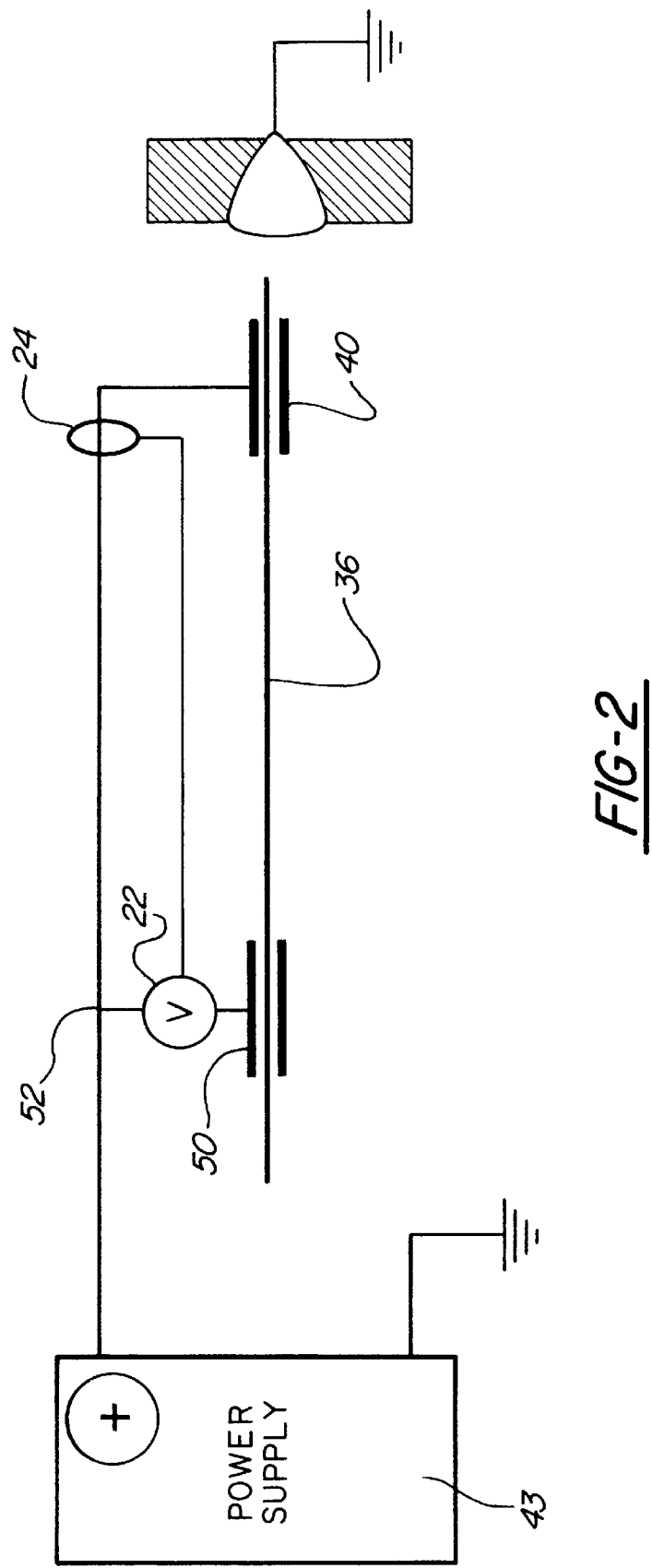
FIG. 2 is a schematic view of the contact tip wear sensor device in a GMAW welding torch in accordance with the present invention.

Referring now to FIG. 2, the contact tip 40 is prone to damage due to contamination of the consumable electrode 34 and the elevated service temperatures at the axial bore 42. Damage to the axial bore 42 adversely affects the quality of current transfer to the consumable electrode 34. This also promotes feedability and electrode misalignment problems. The extent of the damage can be monitored by determining the instantaneous resistance of the contact between the contact tip 40 and the consumable electrode 34. This resistance is calculated by dividing the instantaneous voltage drop at the contact interface (interfacial voltage) over the instantaneous welding current. The interfacial voltage is measured between a sliding electrical contact 50 and the power supply connection 52. The welding current is measured by a current sensor 24 mounted on the torch 10. The system requires electrical insulation of the liner so that electrical contact in the torch is only permitted at the contact tip 40.

Although the invention has been described by reference to a specific embodiment, it should be understood that numerous changes might be made within the spirit and scope of the inventive concepts described. Accordingly, it is intended that the invention not be limited to the described embodiment, but that it have the full scope defined by the language of the following claims.

What is claimed is:

1. An arc welding torch for robotic applications comprising a main housing, a gooseneck, a contact tip assembly and a plurality of different welding operational parameter sensors wherein said sensors are mounted on said main housing, said gooseneck, or said contact tip assembly providing simultaneous real-time monitoring of a plurality of different welding operational parameters during a welding process.

2. A welding torch of claim 1 wherein the sensors are operatively connected to a weld controller that analyzes the sensed welding operational parameters and controls the welding process in response to the sensed welding operational parameters.

3. An arc welding torch for robotic applications comprising:

a contact tip wear sensor for providing a contact tip wear signal indicating the deterioration of a contact tip of the torch during the current welding process;

a gas flow sensor for providing a gas flow signal indicating a gas flow rate through a housing of the torch;

a temperature sensor for providing a temperature signal indicating a temperature of front-end components of the torch;

a wire speed sensor for providing a wire speed signal indicating a speed at which an electrode is feed through the torch; and a current sensor for providing a welding current signal indicating the current passed through the torch;

said sensors being mounted on said arc welding torch providing simultaneous real-time monitoring of a plurality of different welding operational parameters during a welding process.

4. A welding torch as in claim 3 further including a seam-tracking sensor wherein said seam-tracking sensor is one of a laser, optical, and touch seam-tracking sensor.

5. A welding torch as in claim 3 wherein the temperature sensor includes a plurality of thermocouples mounted on the contact tip of the torch.

6. A welding torch as in claim 3 wherein the wire speed sensor includes a plurality of encoders mounted within the housing of the torch and a drive-roll mechanism that spins as the consumable electrode passes through.

7. A welding torch as in claim 3 wherein the gas flow sensor triggers an alarm when the gas flow rate falls outside a predetermined range.

8. A welding torch as in claim 3 wherein the contact tip wear sensor measures the deterioration of the contact tip by determining electrical contact resistance between contact tip and consumable electrode.

9. A welding torch as in claim 8 wherein the electrical contact resistance is determined by dividing a voltage at an interface between the contact tip and the electrode by the welding current.

10. A welding torch as in claim 3 wherein the current sensor measures the electrical current flow through the torch.

11. A welding torch as in claim 3 wherein the contact tip wear, gas flow, wire speed, welding current, and temperature sensors are operatively connected to a weld controller which analyzes sensor output signals produced by said sensor and controls the welding process in response to the sensor output signals.

\* \* \* \* \*